United States Patent [19]

Dambre

[11] Patent Number: 4,952,249

[45] Date of Patent: Aug. 28, 1990

[54] INTERMEDIATE COATING OF STEEL WIRE

[75] Inventor: Paul Dambre, Kemmel, Belgium

[73] Assignee: N.V. Bekaert S.A., Zwevegem, Belgium

[21] Appl. No.: 191,338

[22] Filed: May 9, 1988

[30] Foreign Application Priority Data

May 20, 1987 [EP] European Pat. Off. ....... 87.200954.3

[51] Int. Cl.$^5$ ............................................... C21D 9/52
[52] U.S. Cl. ........................... 148/11.5 Q; 148/12 B; 428/677
[58] Field of Search ..................... 428/607, 625, 677; 148/11.5 Q, 12 B; 72/47, 286, 378; 29/527.4, 527.2; 427/357, 383.9, 405

[56] References Cited

U.S. PATENT DOCUMENTS

| | | | |
|---|---|---|---|
| 2,746,135 | 5/1956 | Harris | 428/625 |
| 2,870,526 | 1/1959 | Adler | 428/625 |
| 4,143,209 | 3/1979 | Gerspacher et al. | 428/677 |
| 4,255,496 | 3/1981 | Haemers | 428/677 |
| 4,304,113 | 12/1981 | Takei et al. | 72/47 |
| 4,347,290 | 8/1982 | Haemers | 428/625 |
| 4,446,198 | 5/1984 | Shemenski et al. | 428/677 |
| 4,502,595 | 3/1985 | Trobitsyn et al. | 148/11.5 Q |
| 4,525,430 | 6/1985 | Bourgois | 428/625 |
| 4,606,392 | 8/1986 | Weidenhaupt et al. | 152/556 |
| 4,645,718 | 2/1987 | Dambre | 428/625 |
| 4,651,513 | 3/1987 | Dambre | 57/217 |
| 4,677,033 | 6/1987 | Coopens et al. | 428/677 |
| 4,679,387 | 6/1987 | Weidenhaupt et al. | 152/556 |
| 4,683,175 | 6/1987 | Bakowell et al. | 148/11.5 Q |
| 4,704,337 | 11/1987 | Coppens et al. | 428/677 |
| 4,704,337 | 11/1987 | Coppens et al. | 428/677 |
| 4,737,392 | 4/1988 | Dambre | 420/99 |
| 4,759,806 | 7/1988 | Dambre | 428/676 |
| 4,807,680 | 2/1989 | Weidenhaupt et al. | 152/451 |
| 4,828,000 | 5/1989 | Lievens et al. | 428/659 |
| 4,829,760 | 5/1989 | Dambre | 152/451 |

FOREIGN PATENT DOCUMENTS

| | | | |
|---|---|---|---|
| 0009846 | 4/1980 | European Pat. Off. | |
| 56-96977 | 8/1981 | Japan | 428/625 |

OTHER PUBLICATIONS

Research Disclosure, vol. 177, No. 125, Sep. 1974, p. 13, Abstract No. 12517.

*Primary Examiner*—John J. Zimmerman
*Attorney, Agent, or Firm*—Foley & Lardner, Schwartz, Jeffery, Schwaab, Mack, Blumenthal & Evans

[57] ABSTRACT

After a last patenting operation at a first diameter $d_1$ a steel wire is (a) drawn by means of a lubricant to an intermediate work hardened state at an intermediate diameter $d_2$, (b) coated at said intermediate diameter $d_2$ and work hardened state with a brass alloy, (c) drawn at said intermediate diameter $d_2$ and work hardened state to a final diameter $d_f$. This process may increase the ultimate tensile strength of the steel wire and may reduce the frequency of fractures during the drawing operation. The process also may provide steel wires with an improved adhesion to rubber.

9 Claims, No Drawings

INTERMEDIATE COATING OF STEEL WIRE

The invention relates to a process for manufacturing a steel wire adapted for the reinforcement of rubber products such as tires and hoses. The invention especially relates to a process of manufacturing a high-tensile steel wire and more particularly to a process of manufacturing a super-high-tensile steel wire. The invention also relates to a steel wire with a high-tensile strength $R_m$ and an improved adhesion to rubber.

A high tensile steel wire is a steel wire which has a tensile strength $R_m$ of more than 2250-1130 log d N/mm$^2$; d is the diameter of the steel wire and is expressed in mm. A super-high-tensile steel wire is a steel wire which has a tensile strength $R_m$ that is more than 6 percent above the tensile strength $R_m$ of a high-tensile steel wire with equal diameter.

A steel wire adapted for the reinforcement of rubber products conveniently has a carbon content of more than 0.60 percent by weight (e.g. more than 0.65%, 0.78%, 0.82%, or 0.95%). A typical steel composition is: a minimum carbon content above 0.65%, a manganese content between 0.40 and 0.70%, a silicon content between 0.15 and 0.30% and a maximum sulphur and maximum phosphorus content of 0.03%, all percentages being percentages by weight. Other, more expensive, elements such as chromium may also be alloyed. The diameter of the wire for the reinforcement of rubber tires lies in the range of 0.05 mm to 0.80 mm, preferably in the range of 0.05 mm to 0.40 mm (e.g. 0.08 mm, 0.16 mm or 0.31 mm). The diameter of the wire for the reinforcement of hoses lies in the range of 0.80 mm or 2.00 mm.

The elongation at rupture of a steel wire adapted for the reinforcement of rubber products is at least 1%, preferably at least 2.5%.

The steel wire is usually provided with a coating which promotes the adherence of the steel wire to the rubber product.

This coating often comprises a layer of brass alloy. Brass alloy contains 58 to 75 atomic percent of copper, preferably 67 to 72% (the atomic percentages being the relative quantity of atoms with respect to the total quantity), the remainder being essentially zinc but also eventually other metals such as tin, nickel, cobalt, iron, ... Such a coating of brass alloy is not only used for the adhesion of the steel wire to the rubber product but also to enhance the drawability of the steel wire: the lubricating properties of a brass alloy, especially of an $\alpha$ (alpha)-brass are well known in the art.

According to the prior art a steel wire rod (start diameter $d_s$ usually between 5.5 mm and 6.5 mm) is firstly cleaned by mechanical descaling and by chemical pickling in a H$_2$SO$_4$ or HCl solution. The wire rod is then rinsed in water and after drying, the wire rod is subjected to one or more dry drawing operations and one or more intermediate patenting operations. The last intermediate patenting operation of a steel wire for the reinforcement of rubber tires is done at a diameter $d_1$ of about 1.0-1.5 mm. The steel wire is then pickled, rinsed and covered with a brass coating. The covering can e.g. be done in the following way: electrolytic plating in a Cu-pyrophosphate-bath followed by electrolytic plating in a ZnSO$_4$-bath, followed by thermodiffusion by heating to a temperature of 450° to 600° C. for a few seconds. The steel wire is subsequently wet-drawn from its diameter $d_1$ towards a final diameter $d_f$ of about 0.20-0.30 mm, in a conventional liquid lubricant. All these mentioned operations are well known in the art. The cable formation comes next to the wet-drawing operation. The steel cord can be formed either by cabling as by bunching the steel wires. Cabling is defined as the cable formation during which the individual steel wires and strands are only subjected to bending deformations, bunching is defined as the cable formation during which the individual wires are subjected both to bending and to torsional deformations. Typical steel cord construction for tires are: $4 \times 1 \times 0.25$; $(2 \times 1 + 2 \times 1) \times 0.25$; $7 \times 3 \times 0.15$ and $2 \times 0.20$. The last intermediate patenting operation of a steel wire for the reinforcement of hoses is done at a diameter $d_2$ of about 2.5-3.5 mm.

However, the process according to the prior art has several disadvantages. The percentage reduction in cross-sectional area R of the steel wire after the last intermediate patenting operation is limited to values of 96-97%. The value of 96% corresponds e.g. to an intermediate diameter $d_1$ of 1.5 mm and a final diameter $d_f$ of 0.30 mm. As a consequence of this limitation the ultimate tensile strength $R_m$ of the steel wire is also limited.

One advantage of steel wires with a high-tensile strength $R_m$ is that, in comparison with normal tensile steel wires, less steel is needed for the reinforcement of rubber products. Less steel means less surface for adhesion. As a consequence it is difficult, if not impossible, to benefit completely of the advantage of high-tensile steel wires if one does not improve the adhesion behaviour of high-tensile steel wires. Up to now, however, high-tensile steel wires did not show an improved adhesion behaviour.

In some cases of the prior art values of R of more than 97% were attained. However, this was not without a substantial increase in the frequency of fractures of the steel wire during the last steps of the wet-drawing or during the cable formation, especially during the bunching formation. Until now it was possible to attain values of R of more than 97% on a large, industrial and economical basis.

It is an object of the present invention to attain values of the percentage reduction of cross-sectional area R of more than 97%. It is another object of the invention to increase the ultimate strength $R_m$ of the steel wire. It is a further object of the invention to reduce considerably the frequency of fractures of steel wire during the wet-drawing and during the cable formation. It is also an object of the invention to provide steel wires having a high-tensile strength and an improved adhesion to rubber products.

According to one aspect of the present invention there is provided a process of treatment of a drawn steel wire of a first diameter $d_1$ ad in a patented state into a steel wire of a smaller diameter $d_f$ adapted for the reinforcement of rubber products, characterized by (a) drawing said wire by means of a lubricant to an intermediate work hardened state at an intermediate diameter $d_2$, said lubricant comprising a zinc coating, (b) pickling away say zinc coating, (c) coating said wire at said intermediate diameter $d_2$ and work hardened state with a brass alloy, (d) drawing said wire at said intermediate diameter $d_2$ and work hardened state to a final diameter $d_f$.

The use of a lubricant comprising a zinc coating may be done by electroplating the steel wire at the first diameter $d_1$ in a ZnSO$_4$-bath. The zinc coating may be easily taken away by pickling at diameter $d_2$.

The process according to the present invention allows to attain values of the percentage reduction in cross-sectional area R of the steel wire of more than 97% and even of more than 98%. The ultimate tensile strength $R_m$ of the steel wire is more than 3500 N/mm$^2$ and even more than 3700 N/mm$^2$ for a final diameter $d_f$ of about 0.20 mm.

The coating of the brass alloy can be done by electroplating followed by thermodiffusion. The brass alloy preferably contains at least 65 atomic percent of copper and is preferably an α-brass alloy, because of the deformability of an α-brass alloy. However, due to the fact that the brass alloy coating is not subjected to the whole wet drawing operation an amount of maximum 20% β-brass (i.e. a minimum of 63 atomic percent of copper) is still allowable. In a more general sense the process according to the invention permits the use of less deformable coating compositions.

The mass of the brass alloy coating is preferably less than 2.2 g per kg steel wire. This corresponds e.g. to a mass of less than 4.3 g per m$^2$ steel wire surface for a second intermediate diameter $d_2$ of 1.0 mm.

Whenever thermodiffusion is applied care must be taken to limit the thermodiffusion time in order to avoid substantial changes in the work hardened state of the steel wire.

According to another aspect of the present invention there is provided a steel wire adapted for the reinforcement of rubber products having a diameter $d_f$, a high-tensile strength $R_m$ and a coating of brass alloy, said coating having an average thickness δ, characterized in that for a diameter $d_f$ between 0.05 mm and 0.3 mm said average thickness δ is less than 0.16 μm, for a diameter $d_f$ between 0.3 mm and 0.4 mm said average thickness δ is less than 0.25 μm, and for a diameter $d_f$ greater than 0.4 mm said average thickness δ is less than $d_f$ (mm)(/1700 μm. Preferably the steel wire is a super-high-tensiled steel wire.

The average thickness δ of the brass alloy coating of a steel wire may be determined indirectly by measuring the mass m of the brass alloy. The mass m of the brass alloy coating may be determined in the following way: The brass coating is stripped from the steel wire by dissolving it in ammonia and ammonium persulfate solution which does not affect the iron. The mass of coating is the difference in mass between the coated and the stripped wire. The average thickness δ is then given by the formula:

$$\delta(\mu m) = m(g/kg) \times d(mm) \times 0.235.$$

The aspect of the present invention will become better understood from the following detailed description.

A process according to the prior art is compared with a process according to the present invention in the following way: For both processes a wire rod having a carbon content of 0.80 percent by weight is dry drawn from a start diameter $d_s$ of 5.50 mm to a first diameter $d_1$ of 1.50 mm, the steel wire is then degreased and then subjected to an intermediate patenting operation (this is austhenitizing at a temperature of about 980° C. and subsequently quenching in a lead bath at a temperature of about 630° C. during 5 seconds). The speed of the steel wire during this intermediate patenting operation is about 25 m/min.

Then, for the process according to the prior art, the steel wire (at $d_1$) is pickled in $H_2SO_4$, rinsed with water, electro-plated in a Cu-pyrophosphate-bath, rinsed with water, electro-plated in a $ZnSO_4$-bath, rinsed with water and then subjected to a thermodiffusion in order to form the brass alloy coating (67.5 atomic cent copper). Then the steel wire is wet drawn from the first diameter $d_1$ of 1.50 mm to a diameter of 0.20 mm and attempts were made to wet draw the steel wire to a diameter of 0.175 mm.

For the process according to the present invention, the steel wire at $d_1$ is pickled in $H_2SO_4$, rinsed with water, electro-plated with Zn in a $ZnSO_4$-bath, rinsed with water and drawn from the first diameter $d_1$ of 1.50 mm to an intermediate diameter $d_2$ of 1.0 mm. At $d_2$ the steel wire is pickled in $H_2SO_4$ top take away the zinc coating, rinsed with water, electro-plated in a Cu-pyrophosphate-bath, rinsed with water, electro-plated in a $ZnSO_4$-bath, rinsed with water and then subjected to a thermodiffusion in order to form the brass alloy coating. The brass alloy coating used for this test contains about 67.5 atomic percent copper, the remainder being zinc. Then the steel wire is wet drawn from the intermediate diameter $d_2$ of 1.0 mm to a diameter of 0.20 mm and further to a diameter of 0.175 mm.

Table 1 summarizes schematically both processes:

TABLE 1

| prior art | invention |
|---|---|
| • $d_s$ = 5.50 mm<br>↓ dry drawing | • $d_s$ = 5.50 mm<br>↓ dry drawing |
| • $d_1$ = 1.50 mm<br>patenting<br>coating with brass alloy | • $d_1$ = 1.50 mm<br>patenting<br>coating with zinc |
| • $d_2$ = 1.50 mm<br>↓ wet drawing<br>↓<br>• $d_f$ = 0.20 mm<br>fractures | • $d_1$ = 1.50 mm<br>↓ wet drawing<br>• $d_2$ = 1.00 mm<br>pickling away the zinc<br>coating with brass alloy<br>• $d_2$ = 1.00 mm<br>↓ wet drawing<br>• $d_f$ = 0.175 mm |

Table 2 gives the tensile strength $R_m$ (N/mm$^2$) of the steel wire as a function of the diameter for several steps of the process. The process according to the prior art was carried out twice, the process according to the invention three times.

TABLE 2

| | Tensile strength $R_m$ (N/mm$^2$) | | | |
|---|---|---|---|---|
| | $d_1$ = 1.50 mm | $d_2$ = 1.00 mm | $d_f$ = 0.20 mm | $d_f$ = 0.175 mm |
| Process according to the prior art | 1280 | — | 3955 | N.D. |
| | 1280 | — | 3955 | N.D. |
| Process according to the invention | 1280 | 1687 | 3836 | 4003 |
| | 1280 | 1687 | 3931 | 4090 |
| | 1280 | 1687 | 3826 | 3983 |

N.D. = Not Drawable

A final diameter $d_f$ of 0.20 mm ($d_1$ = 1.50 mm) corresponds to a reduction R of 98.2%, a final diameter $d_f$ of 0.175 mm ($d_1$ = 1.50 mm) corresponds to a reduction R of 98.6%. In this example the increase in reduction R is small: 0.4%. However, a reduction R of 98.2% in the process according to the prior art was reached with a frequency of fractures lying between 10 and 100 fractures per ton, whereas the frequency of fractures for the process according to the invention lies below 10 fractures per ton.

A possible explanation for the advantageous effect of the invention can be given as follows: The process according to the prior art subjects the brass alloy coating to the whole wet drawing operation (from $d_1$ to $d_f$). The more the steel wire is drawn, the smaller the average thickness $\delta$ of the brass alloy layer but also the greater the dispersion of the thickness $\delta$ of the brass alloy layer: the variation of the thickness $\delta$ around the circumference of the steel wire becomes greater according as deformation proceeds. In the ultimate wire drawing steps it is possible that the brass alloy layer is no longer continuous around the circumference of the steel wire, lubrication is no longer done and fractures of the steel wire occur. On the other hand, the process according to the invention does not subject the coating of the steel wire to the whole wet drawing operation. This means that the variation of the thickness $\delta$ is limited.

Moreover, according to the invention the coating of the brass alloy is done at a surface corresponding to the intermediate diameter $d_2$, said surface is due to the preceding coating with zinc and wet drawing, less rough than the surface corresponding to the first diameter $d_1$. As a consequence the initial brass alloy layer at $d_2$ is more homogeneous in thickness and may have a smaller layer thickness $\delta$, as compared with the brass alloy coating at $d_2$ for a process according to the prior art. This means that the process according to the present invention may result in a high-tensile steel wire having a thickness of coating which is smaller than the conventional thickness $\delta$ of coating.

Due to the process of the present invention:
- an average thickness $\delta$ of less than 0.16 μm may be reached for high-tensile steel wires having a diameter $d_f$ between 0.05 mm and 0.30 mm;
- an average thickness $\delta$ of less than 0.25 μm may be reached for high-tensile steel wires having a diameter of $d_f$ between 0.30 mm and 0.40 mm;
- an average thickness $\delta$ of less than $d_f$(mm)/1700 may be reached for high-tensile steel wires having a diameter $d_f$ greater than 0.0 mm.

As a first example for a final diameter $d_f$ of high-tensile steel wire, the conventional thickness $\delta$ of coating is about 0.30 μm, average thicknesses $\delta$ of coating with the process according to the invention are: 0.20 μm, 0.175 μm, 0.16 μm, and 0.15 μm. For a final diameter $d_f$ of 0.20 mm of a high-tensile steel wire, the conventional thickness $\delta$ of coating is about 0.20 μm, average thicknesses $\delta$ of coating with the process according to the invention are 0.12 μm, 0.110 μm, 0.105 μm and 0.100 μm.

Thin layers of brass alloy promote the adhesion of the steel wires to the rubber, because, in comparison with normal thicknesses $\delta$, less copper is available to diffuse into the rubber and to contaminate the rubber.

The invention is not limited to the manufacturing of a steel wire the a brass alloy containing only copper and zinc. The invention relates to alloy brass alloys which promote the adhesion of the steel wire to the rubber product. These brass alloys may comprise not only copper and zinc, but also nickel, tin, cobalt, manganese, iron, cadmium, lead, antimony, . . . . However, these forms of alloys which allow high deformation during drawing, are to be preferred.

I claim:

1. A process of treatment of a drawn steel wire of a first diameter $d_1$ and in a patented state into a steel wire of a smaller diameter $d_f$ adapted for the reinforcement of rubber products, characterized by
   (a) drawing said wire by means of a lubricant to an intermediate work hardened state at an intermediate diameter $d_2$, said lubricant comprising a zinc coating,
   (b) pickling away said zinc coating,
   (c) coating said wire at said intermediate diameter $d_2$ and work hardened state with a brass alloy,
   (d) drawing said wire at said intermediate diameter $d_2$ and work hardened state to a final diameter $d_f$.

2. A process according to claim 1 characterized in that the percentage reduction in cross-sectional area R of the steel wire from the first diameter $d_1$ to the final diameter $d_f$ is more than 97%.

3. A process according to claim 2 characterized in that the percentage reduction in cross-sectional area R of the steel wire from the first diameter $d_1$ to the final diameter $d_f$ is more than 98%.

4. A process according to claim 1 characterized in that the first diameter $d_1$ of the steel wire is more than 1.5 mm and the final diameter $d_f$ is less than 0.30 mm.

5. A process according to claim 4 characterized in that the ultimate tensile strength $R_m$ of the wire is more than 3500 N/mm².

6. A process according to claim 1 characterized in that the coating of the brass alloy is done by electroplating followed by thermodiffusion.

7. A process according to claim 1 characterized in that the brass alloy contains at least 65 atomic percent of copper.

8. A process according to claim 1 characterized in that the brass alloy is an α-brass alloy.

9. A process according to claim 1 characterized in that the mass m of the brass alloy coating is less than 2.2 g per kg steel wire.

* * * * *